(12) United States Patent
Denson et al.

(10) Patent No.: US 11,685,638 B2
(45) Date of Patent: Jun. 27, 2023

(54) SYSTEM, METHOD AND APPARATUS FOR FABRICATING, HAULING, AND DEPLOYING AN INDUSTRIAL CRANE MAT CONSTRUCTED FROM RECYCLED WINDMILL TURBINE SPARS

(71) Applicants: Michael Ray Denson, Abilene, TX (US); Marcus Brandon Denson, Tuscola, TX (US)

(72) Inventors: Michael Ray Denson, Abilene, TX (US); Marcus Brandon Denson, Tuscola, TX (US)

(73) Assignee: Best Blade Recycling, LLC, Abilene, TX (US)

( * ) Notice: Subject to any disclaimer, the term of this patent is extended or adjusted under 35 U.S.C. 154(b) by 0 days.

(21) Appl. No.: 17/717,079

(22) Filed: Apr. 10, 2022

(65) Prior Publication Data
US 2022/0380185 A1    Dec. 1, 2022

Related U.S. Application Data

(60) Provisional application No. 63/173,370, filed on Apr. 10, 2021.

(51) Int. Cl.
   *B66C 23/78*     (2006.01)
   *F03D 1/06*      (2006.01)

(52) U.S. Cl.
   CPC ............ *B66C 23/78* (2013.01); *F03D 1/0675* (2013.01); *F05D 2230/70* (2013.01)

(58) Field of Classification Search
   CPC ....... B66C 23/78; F03D 1/0675; F03D 80/00; F05D 2230/70; B29B 2017/0094;
(Continued)

(56) References Cited

U.S. PATENT DOCUMENTS 6,467,385 B1 * 10/2002 Buttrick ................... B27B 5/04
                                                     30/372
9,038,835 B2 *  5/2015  Oliver ..................... B66C 23/78
                                                    212/302
(Continued)

FOREIGN PATENT DOCUMENTS

CN         110154274 A *  8/2019

*Primary Examiner* — Ryan J. Walters
(74) *Attorney, Agent, or Firm* — Michael Roebuck; Moster Craft, P.C.

(57) ABSTRACT

A system and method for fabricating, hauling, and deploying an industrial crane mat constructed from recycled windmill turbine spars. The system and method comprising: removing outer covering from a wind turbine blade with a trimmer, cutting the wind turbine blade into a plurality of uniform boards using a cutter, connecting the plurality of the plurality of uniform boards side by side into two rows of the plurality of uniform boards, using a plurality of rings, wherein the two rows each have a first end and a second end, and wherein the plurality of rings connects a first end of the first row to a second end of the second row together to form a crane mat, bifolding the crane mat onto itself in half along a latitudinal axis of the crane mat using a loader, loading the bifolded crane mat onto a trailer using a line attached to the bifolded crane mat to pull the bifolded crane mat onto the trailer and pulling the bifolded crane mat onto the trailer using a winch.

12 Claims, 15 Drawing Sheets

(58) Field of Classification Search
CPC .............. B29B 2017/022; B29B 17/02; B29B 17/0412; B29B 2017/0428; B29B 2017/044; B29L 2031/085; F05B 2230/70
See application file for complete search history.

(56) References Cited

U.S. PATENT DOCUMENTS

| | | | |
|---|---|---|---|
| 11,225,943 B2 * | 1/2022 | Denson | ................... B27B 5/10 |
| 2019/0066062 A1 * | 2/2019 | Lilly | ...................... G06Q 10/00 |
| 2020/0340207 A1 * | 10/2020 | Denson | ................. B23D 47/04 |
| 2020/0340445 A1 * | 10/2020 | Denson | ................. B23D 47/12 |
| 2021/0370550 A1 * | 12/2021 | Zarecky | ................. B29B 17/02 |

* cited by examiner

SYSTEM, METHOD AND APPARATUS FOR FABRICATING, HAULING, AND DEPLOYING AN INDUSTRIAL CRANE MAT CONSTRUCTED FROM RECYCLED WINDMILL TURBINE SPARS

CROSS REFERENCE TO RELATED APPLICATIONS

This patent application claims priority from U.S. Provisional Patent application Ser. No. 63/173,370 entitled A System, Method And Apparatus For Fabricating, Hauling, And Deploying An Industrial Crane Mat Constructed From Recycled Windmill Turbine Spars filed on 10 Apr. 2021, which is hereby incorporated by reference in its entirety; U.S. Provisional Patent application Ser. No. 63/012,088 A System and Method for Cable Cutting Wind Turbine Blades for Recycling, filed by Denson on 18 Apr. 2020 is hereby incorporated by reference in its entirety; U.S. Provisional Patent application Ser. No. 63/173,370 entitled System and Method for Trimming Wind Turbine Blades, filed on 22 Sep. 2020 by Denson is hereby incorporated by reference in its entirety; and U.S. Provisional Patent application Ser. Nos. 63/090,412 and 63/090,434 entitled A System and Method for Utilizing Water Jets to Remove Balsa Wood Inner Material From The Non-Spar Regions of a Wind Turbine Blade filed by Denson on 12 Oct. 2020 is hereby incorporated by reference in its entirety.

BACKGROUND OF THE INVENTION

There is a need for temporary track on which to drive heavy industrial equipment.

FIELD OF THE INVENTION

The field of the invention is fabricating, hauling, and deploying a industrial crane mats.

SUMMARY OF THE INVENTION

A system, method and apparatus for fabricating, hauling, and deploying an industrial crane mat constructed from recycled windmill turbine spars.

BRIEF DESCRIPTION OF THE DRAWINGS

The attached drawings illustrate various perspectives of schematic depictions of various particular illustrative embodiments of the invention.

DETAILED DESCRIPTION OF THE INVENTION

Figure 1:
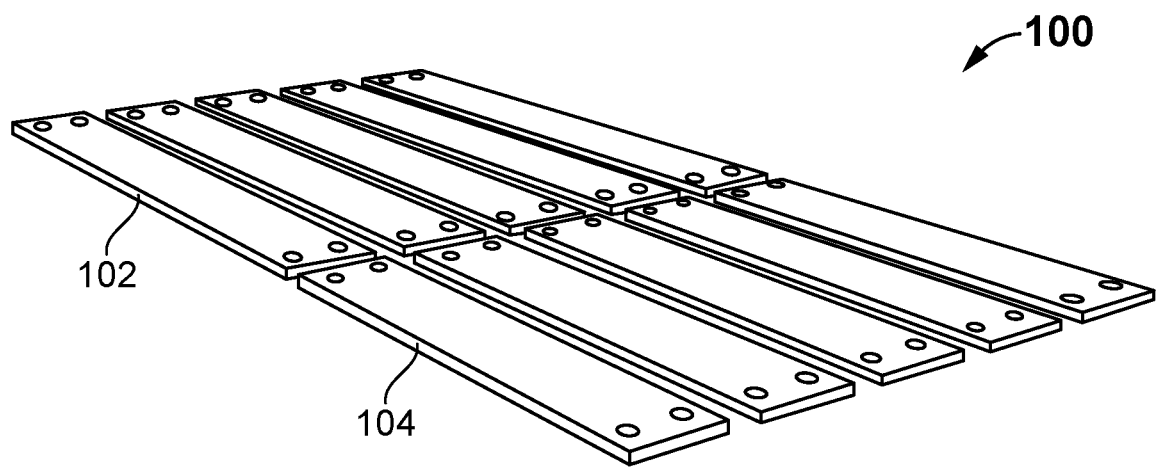
FIG. 1 is a schematic depiction of a side view of a particular illustrative embodiment of the invention.

A system and method of fabricating, hauling, and deploying an industrial crane mat constructed from recycled spars including but not limited to spar boards harvested from decommissioned wind turbine blades. Spar material is cut to size and positioned to achieve desired length of the crane mats of specific values along its longitudinal y-axis. A number of spars as well as spar dimensions can vary as the desired length of crane mat increases or decreases.

Spar material is cut to size are pre-perforated and placed in rows for assembly. A number, shape, and orientation of penetrations may vary. Spars are combined with its fastening hardware that maintains a width at or below 8 feet to fall within the legal width for transportation. Hardware fastens the spars together along the y-direction of the crane mat using the pre-perforated penetrations. Hardware fastens the spars together in the center of the crane mat to unite the two sections and to provide a hinge point for articulation. Type of hardware may vary to include but not limited to wire cable, welded rings, bolts, and or any other necessary fastening hardware or device of any sufficient size and number to accommodate the load requirements. Circular welding rings are used to fasten spar material cut to size, that facilitate folding and articulation of a construction crane mat along both the x and y axes.

Crane mat articulates to fold over the x and y axis and reduce the overall width to 8' or below to fit within the legal shipping requirements. The x-axis utilizes two rows of these spars that total 16 feet when expanded and are at or within 8 feet when bifolded.

In its folded position the crane mat will be picked up with a skid loader or front end loader to be stacked on a trailer until maximum load weight is attained and will be strapped and tied down as necessary to be safely transported. Two rows of five 8' long×20" wide or any other dimension or enumeration of spars necessary to acquire desired post-assembled dimensions that are pre-perforated with a multiplicity of cavities. The gap between the spar boards will vary as necessary to achieve proper size, functionality, strength, and articulation. In its folded position the crane mat will be picked up with a skid loader or front end loader to be stacked on a trailer until maximum load weight is attained and will be strapped and tied down as necessary to be safely transported.

A crane mat is constructed to a length of 48-50 feet by utilizing recycled wind turbine blade spars that are cut to various specific lengths and widths. The 48-50 feet crane mat articulates at the center between the two rows of spars to fold and reduce down to a 8 feet width to maintain a legal shipping dimension. A loader or a duplicity of loaders or any other necessary apparatus or combination of will flip the mat over to its reduced dimension. The loader will use either standard available attachments and forks or a custom built head or a free standing device to safely flip the mat over.

The crane mat can now be pulled onto its transport trailer by either using a chain, wire rope, strap, or any other necessary implement to safely attach to the crane mat by either, securing it to the hardware securing the spars together in the pre-perforated penetrations or utilizing a separate set of pre-perforated penetrations with its own set of hardware in the center of the folded crane mats end closest to the transport trailer.

A roll-up style trailer is placed with a snatch block or winch positioned at the front of the trailer with either chain, wire rope, and or any other material, wherein, the chain, wire rope, and or any other material is routed through the routing ring at the front of the trailer. When a snatch block is used, an excavator or any other sufficient machinery will pull the cable away from the snatch block as it directs the movement straight back onto the trailer. The crane mat is strapped down to the trailer and the tag line that was routed through the snatch block will have an excess amount that will be strapped down approximately every 8 feet along with the crane mat as it is secured to the trailer for safe transport. When a winch is employed the winch can pull the mat straight back onto the trailer wherein the winch will have any excess cabling stored within its housing. Wherein, guides may or may not be installed on the side of the trailer for additional safety. Chain, wire cable, or any other sufficient material is hooked to the crane mat and pulled up and onto the trailer. Pulling the track onto a flatbed for folding.

The crane mats are constructed from recycled spar material, which is salvaged from a wind turbine blade, is unique due to its superior steadfastness in comparison to any currently available technology that has a high rate of failure in the field and frequent breakage. Spars of different widths and lengths can be utilized to construct crane mats of different dimensions and should also be protected herein. The resultant crane mat teaches a method of obtaining a crane mat that is substantially longer in length in comparison to any current available mat and the strength obtained by the utilization of the robust spar material teaches a crane mat that has a much higher tensile strength than the current wood systems.

The crane mat has the ability to articulate further between its segmented sections in the y-direction to adapt to the contour of the landscape its deployed in and to reduce the profile of the mat further if necessary for transport and or storage.

The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

Turning now to FIG. 1, in a particular illustrative embodiment of the invention, a method of fabricating, hauling, and deploying an industrial crane mat is depicted and is constructed using (2) rows of (5) 8' long×20" wide spar boards harvested from decommissioned wind turbine blades. The spar material can be cut to various necessary widths to construct a crane mat of specific values along its y-axis. The x-axis utilizes (2) rows of these spars that total 16' when expanded and are at or within 8' when bifolded. For the purpose of this illustrative embodiment the total length of the (5) 20" spars along the y-axis is approximately 100". The crane mats constructed from recycled spar material is unique due to its superior steadfastness in comparison to any currently available technology that has a high rate of failure in the field and frequent breakage. Spars of different widths and lengths can be utilized to construct crane mats of different dimensions and should also be protected herein.

FIG. 1 depicts the spar material arranged in its preassembled orientation 100. (2) rows 102, 104 of (5) 8 feet×2 inches or any other dimension or enumeration of spars necessary to acquire desired post-assembled dimensions are pre-perforated with a multiplicity of cavities. Spars in combination with its fastening hardware will maintain a width at or below 8' to fall within the legal width for transportation.

Figure 2:
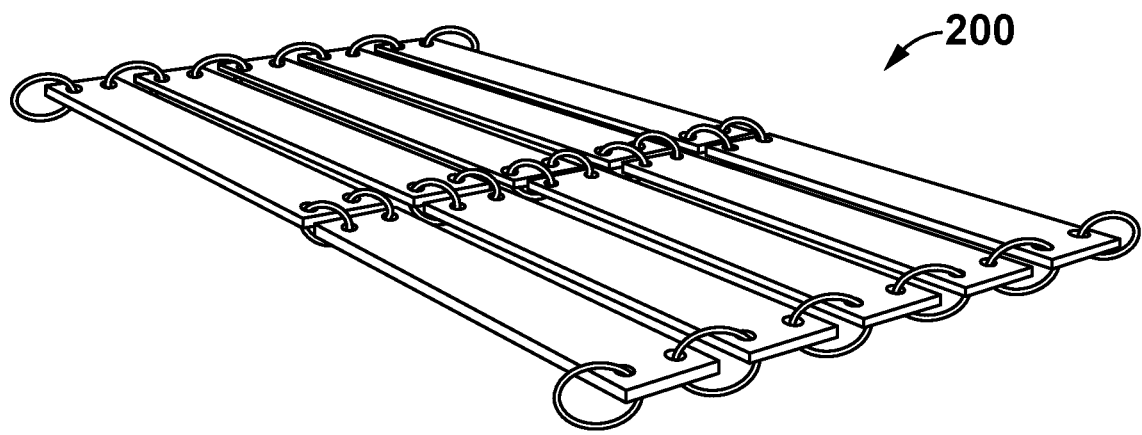
FIG. 2 is a schematic depiction of a side view of a particular illustrative embodiment of the invention.

FIG. 2 depicts a configuration 200 of the crane mat where the spar material is connected together with a combination or exclusive utilization of wire rope, welded metal rings, and or hinges or any other method of fastening consisting of a size of any gauge, diameter, orientation, or enumeration within the safety and duty requirements necessary to connect the spar material together to achieve the desired dimensions and articulations of the crane mat. The mat will have the ability to bifold to enable it to fit within the 8' width requirement while shipping. The gap between the spar boards will vary as necessary to achieve proper size, functionality, strength, and articulation.

Figure 3:
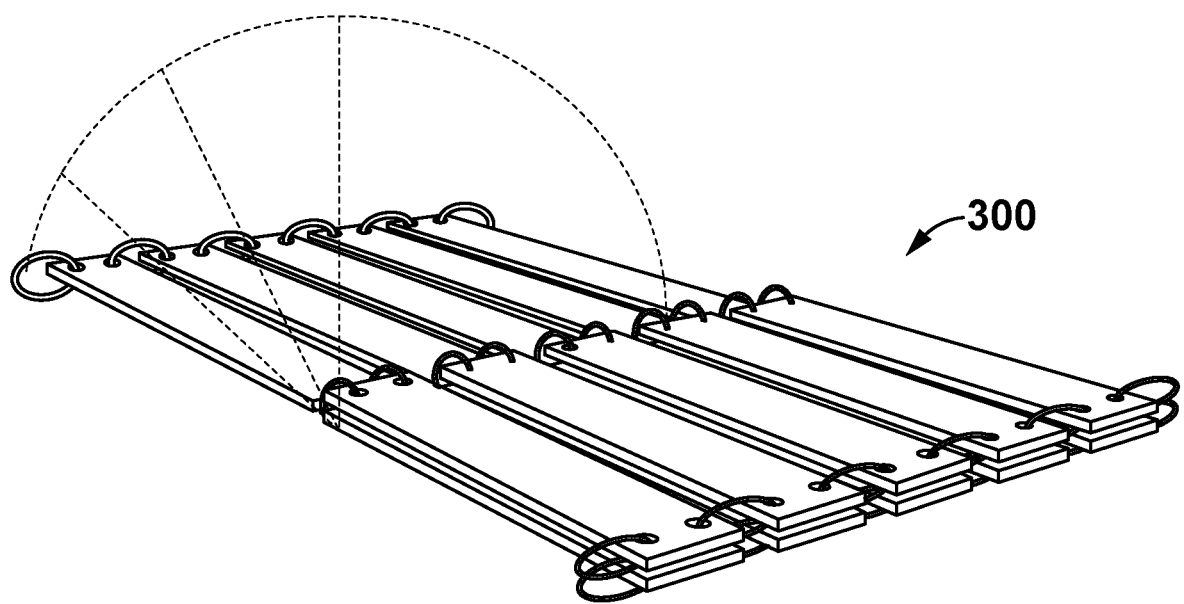
FIG. 3 is a schematic depiction of a particular illustrative embodiment of the invention the crane mat bifolded to decrease its profile for loading and shipping.

Turning now to FIG. 3, FIG. 3 depicts the crane mat in a bifolded configuration 300 to decrease its profile for loading and shipping. Crane mats can be stacked on shipping truck until weight maximum is reached. Crate mat articulates to fold over the x-axis and reduce the overall width to 8 feet or less to fit within the legal shipping requirements.

Figure 4:
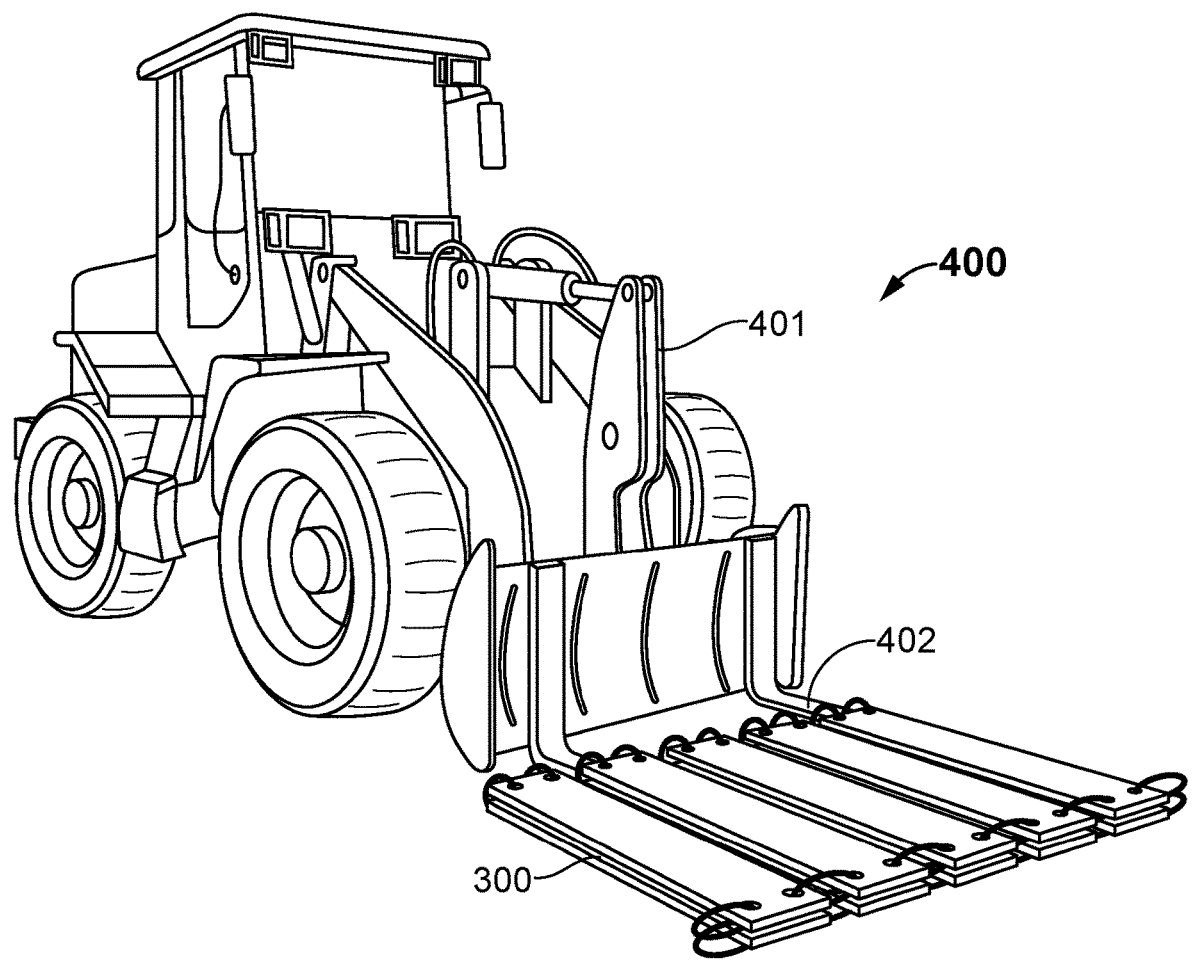
FIG. 4 is a schematic depiction of a particular illustrative embodiment of the invention the crane mat bifolded to decrease its profile for loading and shipping.

Turning now to FIG. 4, FIG. 4 depicts a cranemat in a folded or bifolded configuration 300. A skid loader 401 or a front end loader picks up the folded crane matt with fork lift 402 and stacks the folded crane mats onto a pullup trailer unit a maximum load weight is attained on the trailer. The stacked crane mats are strapped and tied onto the trailer for safe transportation.

Figure 5:
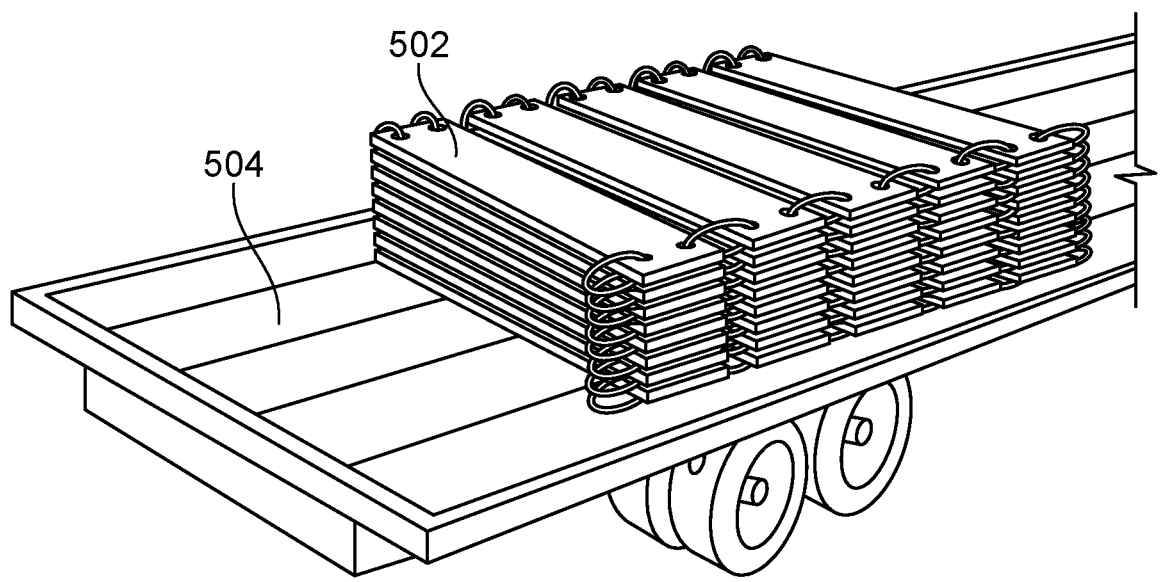
FIG. 5 depicts a stack 502 of folded crane mats lying on a pull up trailer bed 504.

Turning now to FIG. 5, FIG. 5 depicts a stack 502 of folded crane mats lying on a pull up trailer bed 504.

Figure 6:
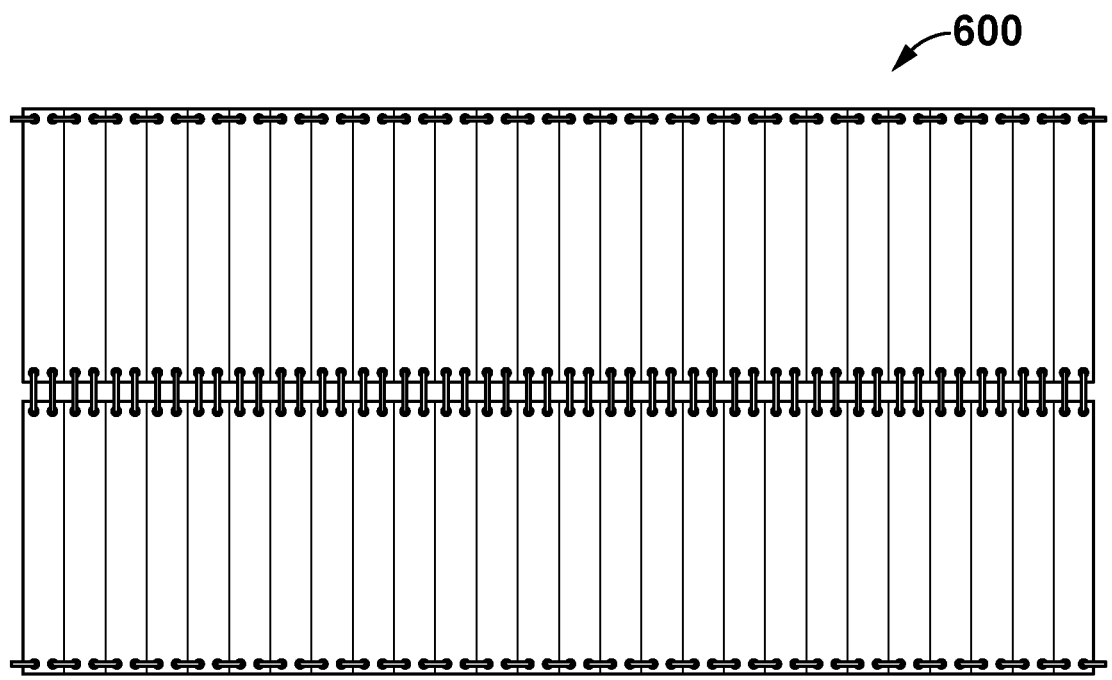
FIG. 6 is a schematic depiction of a particular illustrative embodiment of the invention the crane mat.

Turning now to FIG. 6, FIG. 6 depicts a larger crane mat 600. Using the same concepts and principles featured in FIGS. 1-5, a crane mat is constructed to a length of 48-50 feet by utilizing recycled wind turbine blade spars that are cut to various specific lengths and widths. Pre-perforated penetrations in the spar material is used to route hardware consisting of welded metal rings, wire rope, bolts, and or hinges or any other necessary method of attaching the spars together in their necessary configuration while maintaining structural integrity and mechanical functionality.

Figure 7:
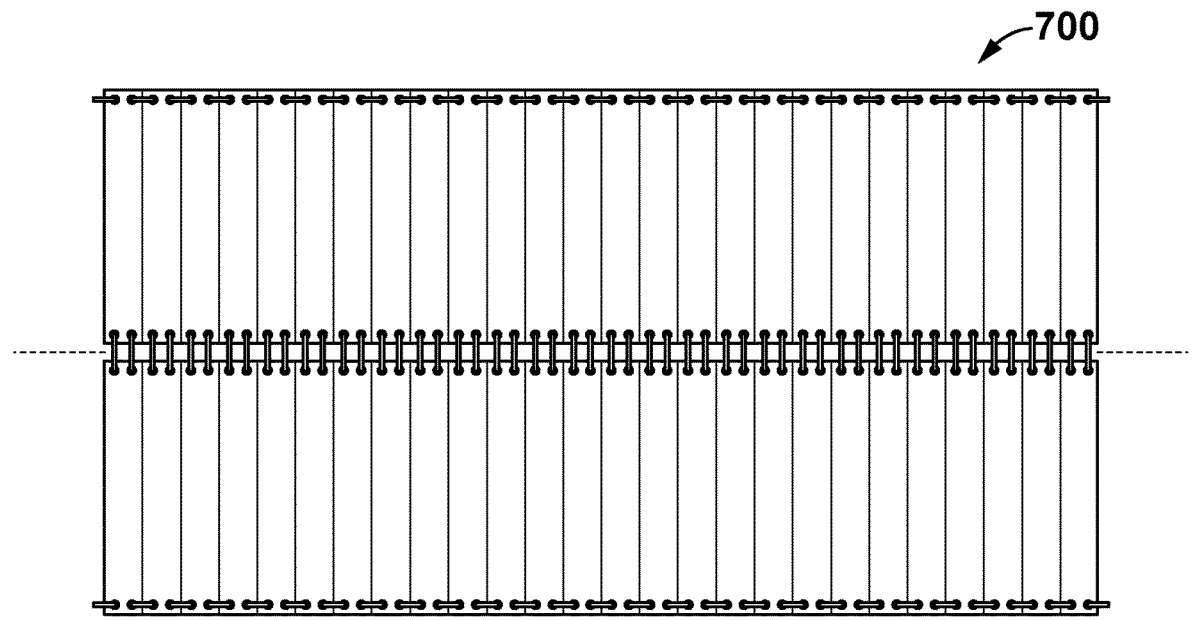
FIG. 7 is a schematic depiction of a particular illustrative embodiment of the invention the crane mat.

Turning now to FIG. 7, FIG. 7 depicts the larger crane mat 700. The 48'-50' crane mat articulates at the center between the two rows of spars to fold and reduce down to a 8' width to maintain a legal shipping dimension. A loader or a duplicity of loaders or any other necessary apparatus or combination of will flip the mat over to its reduced dimension. The loader will use either standard available attachments and forks or a custom built head or a free standing device to safely flip the mat over. The resultant crane mat teaches a method of obtaining a crane mat that is substantially longer in length in comparison to any current available mat and the strength obtained by the utilization of the robust spar material teaches a crane mat that has a much higher tensile strength than the current wood systems. The crane mat has the ability to articulate further between its segmented sections in the y-direction to adapt to the contour of the landscape its deployed in and to reduce the profile of the mat further if necessary for transport and or storage.

Figure 8:
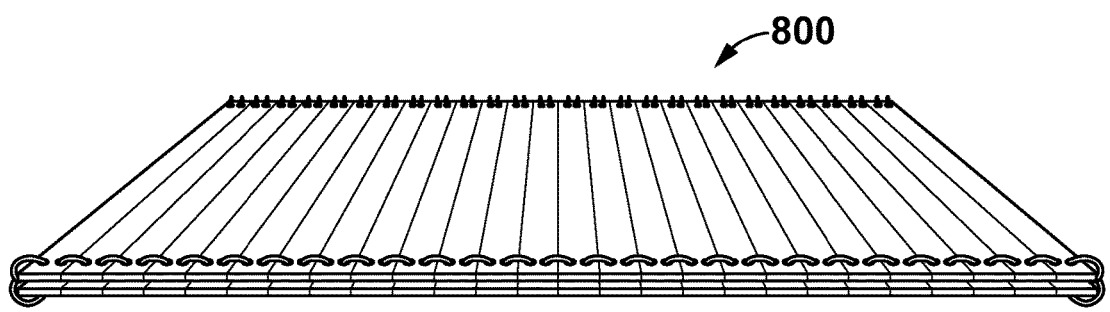
FIG. 8 is a schematic depiction of a particular illustrative embodiment of the invention the crane mat.

Turning now to FIG. 8, FIG. 8 depicts the larger crane mat 800. Using the same concepts and principles featured in FIG. 1-5, the crane mat is depicted after being mechanically flipped along the axis joining the two rows of spars together. The width of mat in now reduced to 8 feet or below to maintain a legal transport width. The crane mat can now be pulled onto its transport trailer by either using a chain, wire rope, strap, or any other necessary implement to safely attach to the crane mat by either securing it to the hardware securing the spars together in the pre-perforated penetrations or by utilizing a separate set of pre-perforated penetrations with its own set of hardware in the center of the folded crane mats end closest to the transport trailer.

Figure 9:
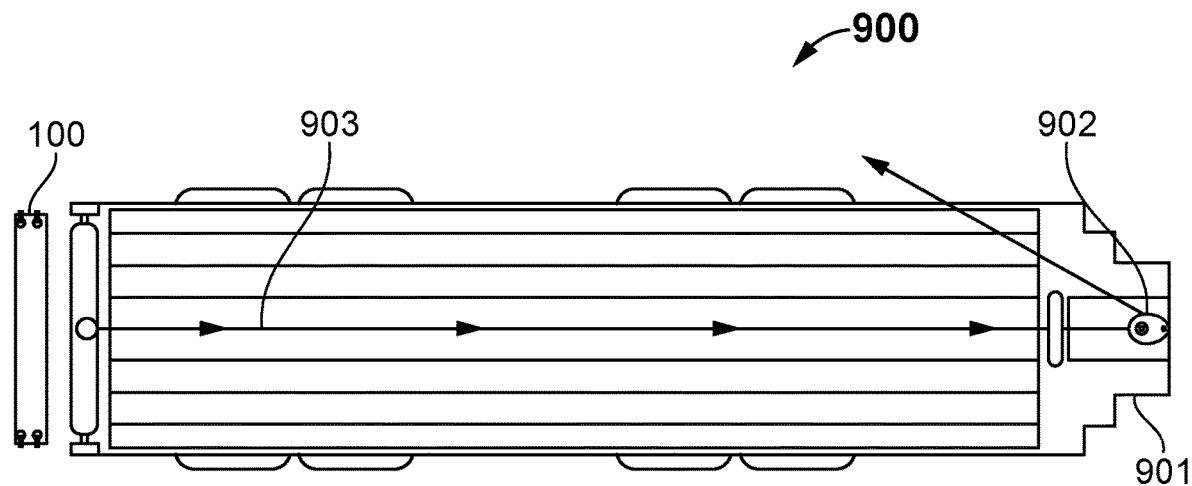
FIG. 9 is a schematic depiction of a particular illustrative embodiment of the invention a roll-up style trailer is depicted with a snatch block or winch positioned at the front of the trailer with either chain, wire rope, and or any other material routed through the routing ring at the front of the trailer.

Turning now to FIG. 9, in FIG. 9 a roll-up style trailer 900 is depicted with a snatch block 901 or winch positioned at the front of the trailer with either chain 903, wire rope, and or any other material routed through the routing ring 902 at the front of the trailer. When a snatch block 901 is used an excavator, or any other sufficient machinery will pull the cable away from the snatch block as it directs the movement straight back onto the trailer. When a winch is employed, the winch can pull the mat straight back onto the trailer.

Figure 10:
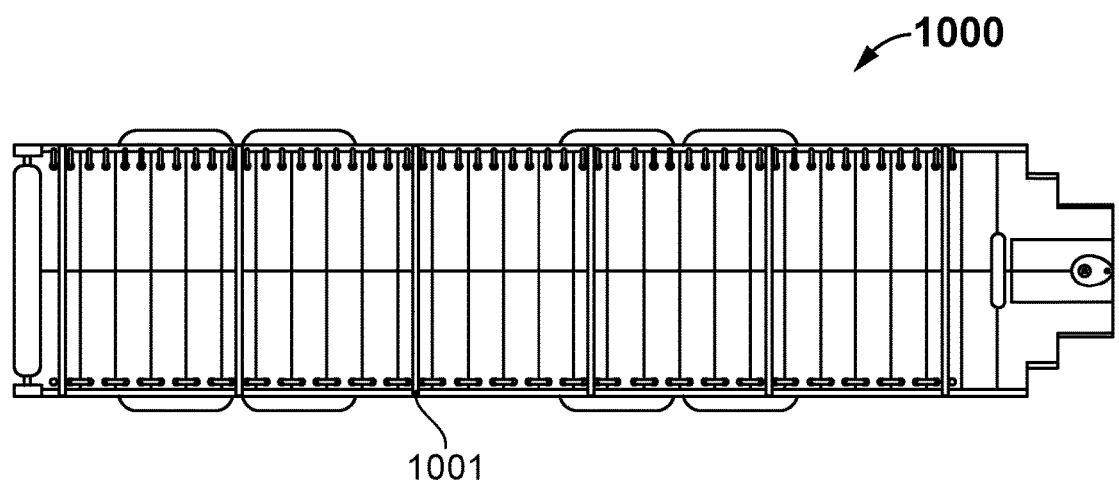
FIG. 10 is a schematic depiction of a particular illustrative embodiment of the invention wherein the crane mat is strapped down to the trailer and the tag line that was routed through the snatch block will have an excess amount that will be strapped down approximately every 8' along with the crane mat as it is secured to the trailer for safe transport.

Turning now to FIG. 10, in FIG. 10 the crane mat is strapped down to the trailer 1000 and the tag line that was routed through the snatch block will have an excess amount that will be strapped down with straps 1000 approximately every 8' along with the crane mat as it is secured to the trailer for safe transport. If a winch is employed to pull the mat onto the trailer than the winch will have any excess cabling stored within its housing.

The spars are prepared using the SPARTA system described in US provisional patent application, incorporated by reference herein in its entirety.

A cutting system using cables for cutting wind turbine blades, wherein the cutting system using cable includes an adjustable support system, wherein the wind turbine blade/wing is accommodated in an adjustable support frame, the adjustable support frame includes adjustable wind turbine blade arms with multiple size adjustments. For example, in a particular illustrative embodiment, 6"×6" square steel tubing are welded into the frame to which cable routing hardware is attached. Four 12" metal spikes to help secure 6"×6" square tubing. The cutting cable is initially guided through length of the wind turbine blade using an electromagnetic roller attached to a small pilot cable. An electromagnet runs along the outside of the wind turbine blade surface and magnetically engages the roller to move the roller and attached cable along the length of the wind turbine blade.

The cables are attached to the fixed end on the adjustable support frame using D-ring, turnbuckles, or other hardware attachments to cut the upper and lower spars, the cable is pulled along the y-axis away from the fixed ends through the D-rings, turnbuckles, or other hardware attachments for cutting out the spars.

The cables have varying diameter. The cable is pulled using forklift, tractor or other mechanical means along the x-axis that creates downward pressure on the edges of the upper and lower spars that are attached to the interior of the wind turbine blade. After the roller and electromagnet are used to pull the smaller pilot cable as the smaller cable is guided through the length of the wind turbine blade, a larger cutting cable is attached to the smaller pilot cable and is pulled through the length of the wind turbine blade for cutting out the spars from the inside of the wind turbine blade.

A system and method of cutting the wind turbine blade to recycle and make products by cutting for production of new composite products, including fiber-reinforced plastics. System or method involved in cutting or crushing wind turbine blade/wing into smaller pieces to make products. Wind turbine blade/wing is cut into smaller pieces using a wire saw by accommodating in the adjustable or movable support frame/bench. The support frame/bench includes adjustable blade/wing support arms with multiple size adjustments, the support frame/bench includes adjustable telescopic vertical beams for blade/wing with multiple size adjustments. However, the 6"×6" square steel tubing are welded into the frame that cable routing hardware is not explicitly disclosed.

The support frame/bench with wind turbine blade cutting includes wheels for moving the system along the length of the wind turbine blade. However, four 12" metal spikes to help secure 6"×6" square tubing is not explicitly disclosed.

The cutting cable is initially guided through length of the wind turbine blade using an electromagnetic roller attached to a small pilot cable.

The sawing cable guide frame on the rope rollers is used for driving the cutting rope for cutting the wind turbine blade. The cable is initially guided through length of the wind turbine blade using an electromagnetic roller. The cables are attached to the deflection rollers with device for tensioning of the saw wire on the support frame for cutting the wind turbine blade. However, the cables are attached to the fixed end on the adjustable support frame using D-ring, turnbuckles, or other hardware attachments to cut the upper and lower spars is not explicitly disclosed.

The cable is pulled using the tensioning device to cut the wind turbine blade. However, the cable is pulled along the y-axis away from the fixed ends through the D-rings, turnbuckles, or other hardware attachments for cutting out the spars is not explicitly disclosed. The wire saw for cutting the wind turbine blade includes, diamond wires or cables have varying diameter. The cable of the wire saw is pulled with tensioning roller which can be adjusted by means of a hand wheel or a hand crank. The wind turbine blades are then cut into sections to be recycled by cutting for production of new composite products, including fiber-reinforced plastics. However, the gutted wind turbine blades cut into sections of usable pieces such as a fence post or wall section for a border wall is not explicitly disclosed.

The device for cutting a wind turbine blade using cables comprising, an electromagnet runs along the outside of the wind turbine blade surface and magnetically engages the roller to move the roller and attached cable along the length of the wind turbine blade. After the smaller cable is guided through the length of the wind turbine blade, a larger cutting cable is attached to the smaller pilot cable and is pulled through the length of the wind turbine blade for cutting out the spars. The four 12" metal spikes to help secure 6"×6" square tubing. The cable is initially guided through length of the wind turbine blade using an electromagnetic roller. The cables are attached to the fixed end on the adjustable support frame is pulled along the y-axis away from the fixed ends through d-ring, turnbuckles, or other hardware attachments to cut the upper and lower spars. The gutted wind turbine blades cut into sections of usable pieces such as a fence post or wall section for a border wall.

Figure 11:
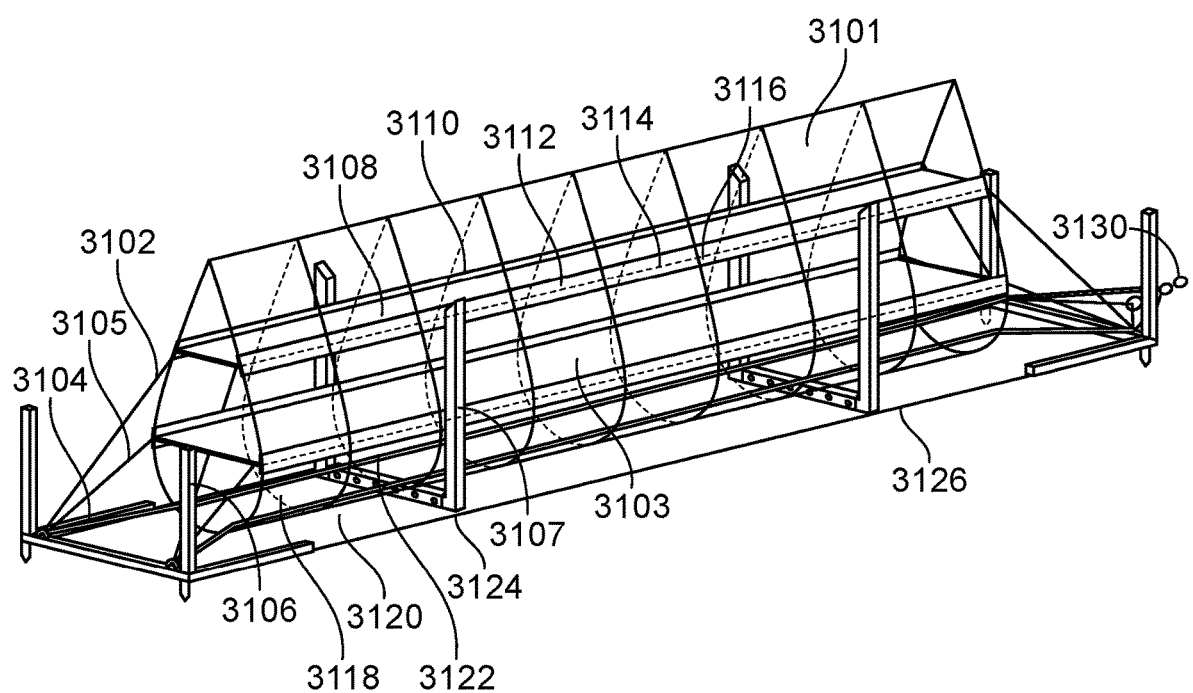
FIG. 11 is side view of a schematic depiction of a particular illustrative embodiment.

As shown in FIG. 11, in a particular illustrative embodiment of the invention a wind turbine blade is placed on a wind turbine blade 101 is placed on a support rack 3126 having adjustable support arms 3124. An upper spar 3108 is cut from an interior of the wind turbine blade using an upper cable 3102. The upper spar is attached to the interior of the wind turbine blade. The connective areas shown in green (3110, 3112, 3114 and 3116) at which the upper spar attaches to the interior surface of the wind turbine blade is weaker and easier to cut than the upper spar itself, as the areas 3110, 3112, 3114 and 3116 are made of a softer material that is easier to cut or penetrate than the harder material that makes up the upper spar. Thus when upper cable 3102 is pulled taunt against a connective point between the upper spar and the interior of the wind turbine blade, the connective areas cut though by the upper cable 3102 when the upper cable is pulled taunt by against the softer areas 3110, 3112, 3114 and 3116 by D rings 3130 thereby separating the upper spar from the interior of the wind turbine blade.

The lower spar 3103 has softer connective areas (shown in green) like 3110, 3112, 3114 and 3116 which cut are though by the lower cable 3105 when the lower cable is pulled taunt by against the green softer areas connecting the lower spar to the interior of the wind turbine blade.

Figure 12:
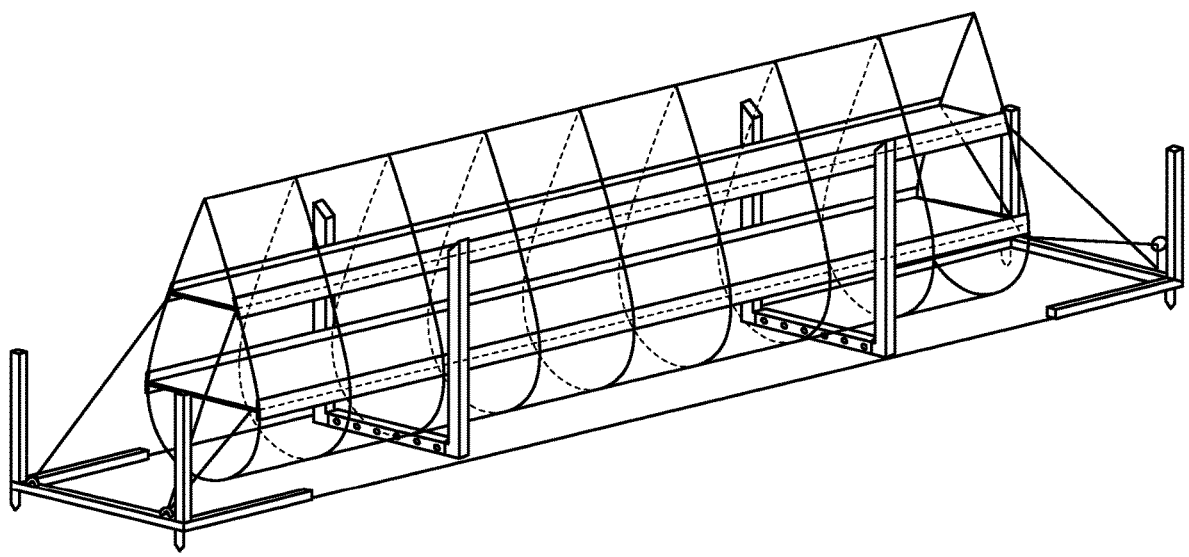
FIG. 12 is side view of a schematic depiction of a particular illustrative embodiment.

Turning now to FIG. 12, FIG. 12 depicts lower cable 3105 positioned to cut through the softer connective areas (shown in green) thereby separating the lower spar from the interior of the wind turbine blade.

Figure 13:
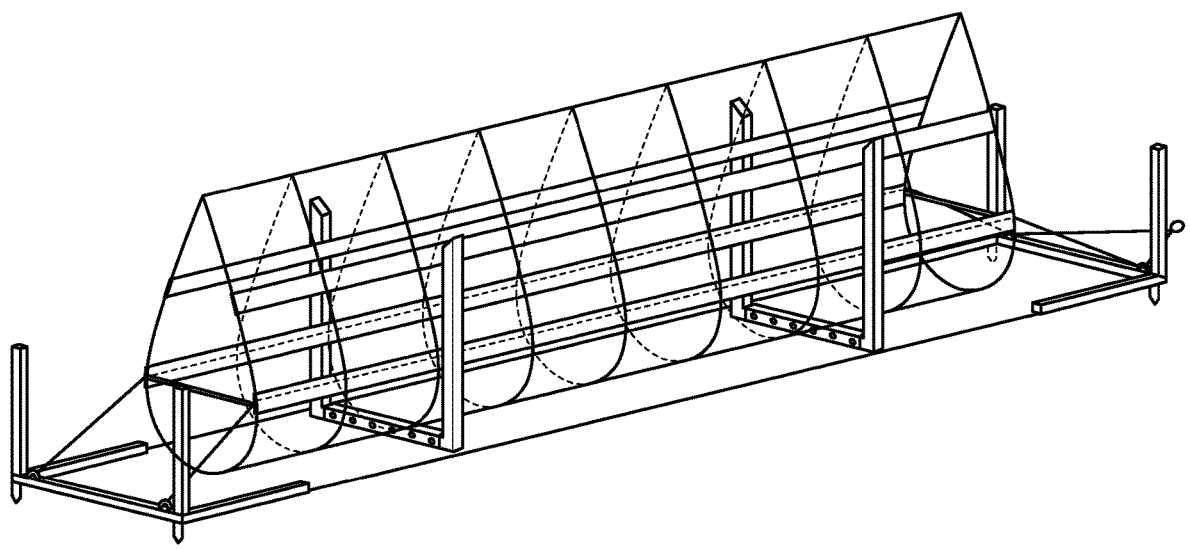
FIG. 13 is side view of a schematic depiction of a particular illustrative embodiment.

Turning now to FIG. 13, FIG. 13 depicts the lower and upper cable in a resting position after cutting through the upper and lower spar connective areas thereby separating the upper and lower spar from the interior of the wind turbine blade so that the upper and lower spars can be removed from the interior of the wind turbine blade.

Figure 14:
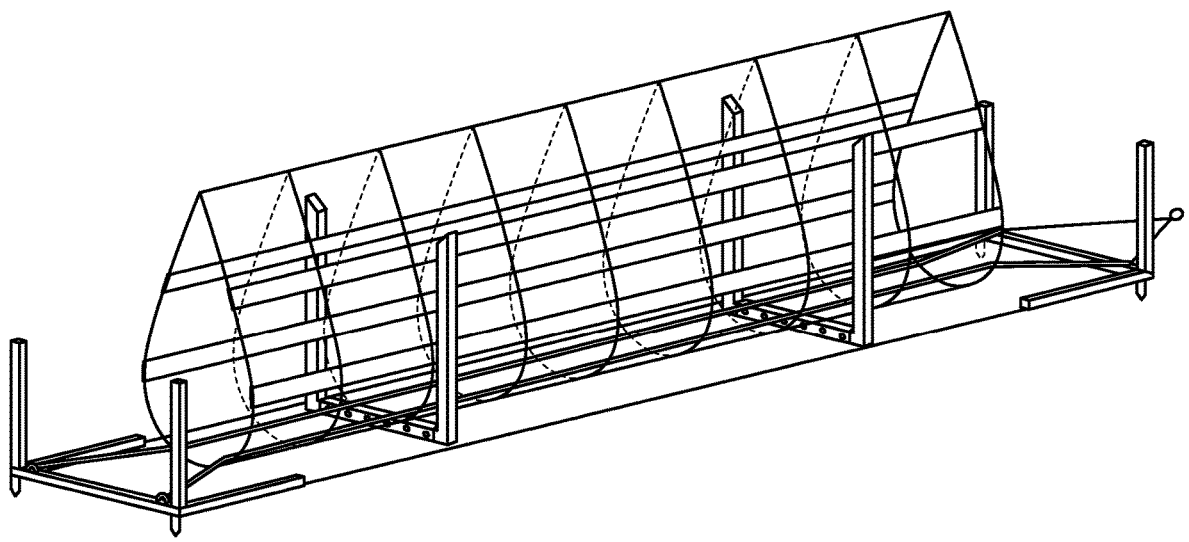
FIG. 14 is side view of a schematic depiction of a particular illustrative embodiment.

As shown in FIG. 14, in a particular illustrative embodiment of the invention, FIG. 14 depicts the wind turbine blade after the upper and lower spars have been removed by the cable cutter.

Figure 15:
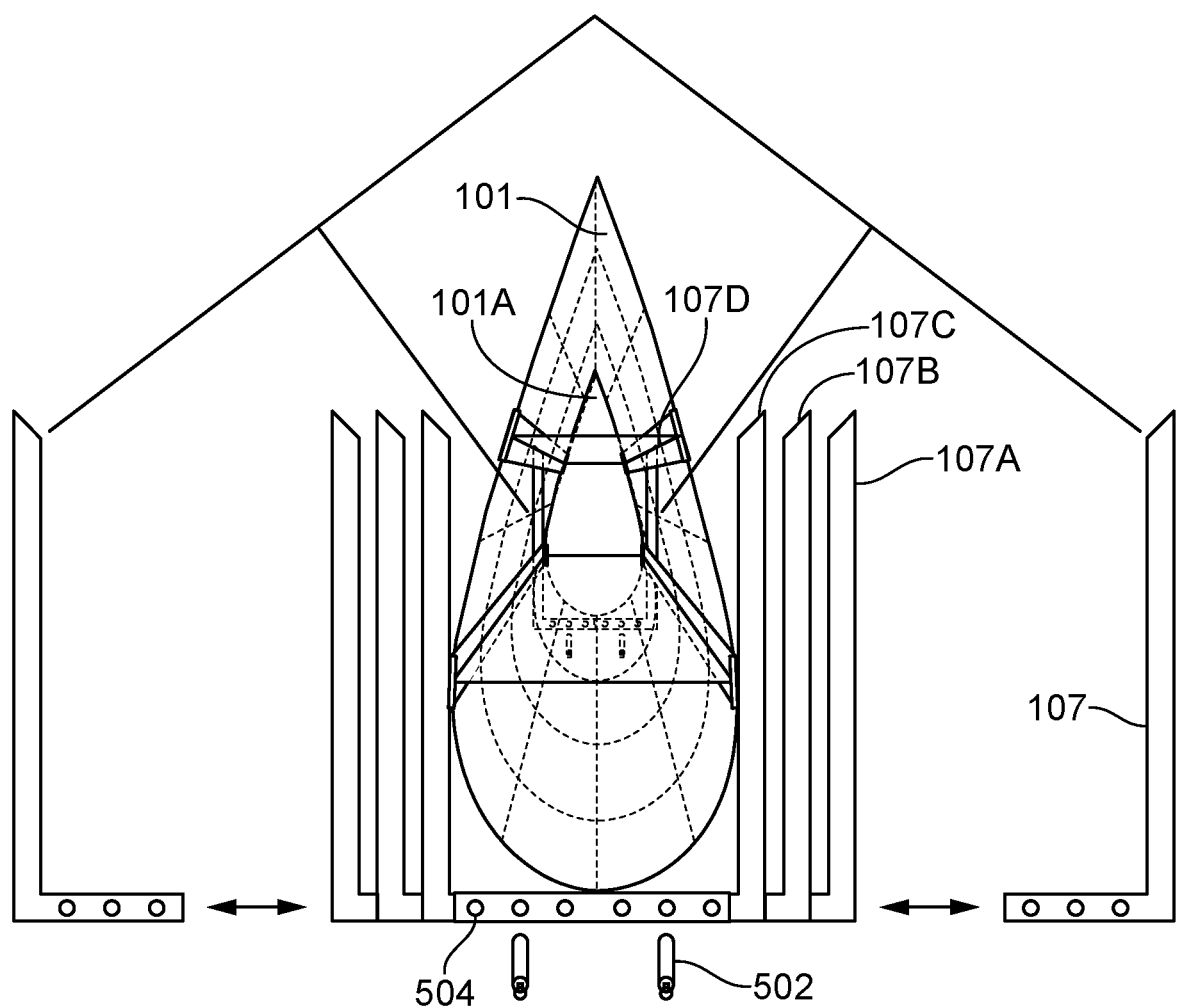
FIG. 15 is side view of a schematic depiction of a particular illustrative embodiment.

FIG. 15 depicts a particular illustrative embodiment of the invention wherein the wind turbine blade 101 is held in place by adjustable vertical supports arms 3107 while the upper and lower cables are positioned for cutting and spars from the inside of the wind turbine blade. The adjustable support arms 107 are shown in different positions 3107, 3107A, 3107B, 3107C and 3107D to accommodate different widths of wind turbine blades as shown by larger wind turbine blade 101 and smaller wind turbine blade 3101A. Larger wind turbine blade 3101 is wider at it bottom and thus the support arms are positioned farther apart by the pins than the support arms holding the smaller wind turbine blade 3101A which is the narrower bottom of smaller wind turbine blade 3101A. The vertical support arms are held in place by system pins that fit through holes in a horizontal section of the support arm and the support structure to hold the support are in place and hold the wind turbine blade in place during cable cutting.

Figure 16:
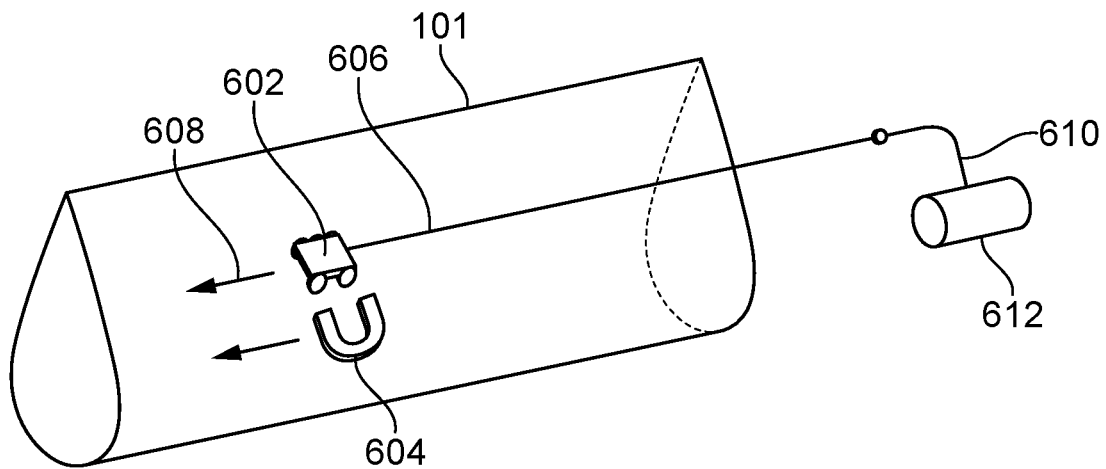
FIG. 16 is a side view of a roller and electromagnetic that guides a pilot cable through the interior of the wind turbine blade to pull a cutting cable through the length of the wind turbine blade.

FIG. 16 is a side view depiction of a particular illustrative embodiment of the invention, wherein an electromagnetic 3604 is used to guide a roller 3602 and an attached pilot cable 3606 through the length of the interior of the wind turbine blade 3101. The roller is urged along path 3608 by moving the electromagnet on the outside surface of the wind turbine blade, along path 3608, while the electromagnet is electromagnetically engaged with the roller so that movement of the electromagnet causes corresponding movement of the roller that track the path of the electromagnet. The pilot cable is then used to pull a heavier upper and lower cutting cables 3610 through the length of the interior of the wind turbine blade along path 3608. In a particular illustrative embodiment of the invention, the cutting cables are spooled off of a reel 3612. A pilot cable that is smaller and more pliable than the cutting cable is attached to roller 3602. The roller is ferromagnetic so that an electromagnet 3604 is activated on the outside surface of the wind turbine blade 3101 electromagnetically engages the roller so that the roller moves along a length of the interior of the wind turbine blade as the electromagnet is moved along a length of the outside surface of the wind turbine blade. After pilot cable is pulled though the length of the interior of the wind turbine blade, by the roller and the electromagnet a cutting cable is attached to one end of the pilot cable and the cutting cable is pulled through the length of the wind turbine blade by the pilot cable. After the upper and lower cutting cables are pulled through the length of the wind turbine blade the cutting cable is attached at one end of the cutting cable to the support rack by D rings. The other end of the cutting cable is attached to a tractor by D rings so that the cutting cable is pulled to cut through the spars at the point where the spars attached to the interior of the wind turbine blade. The upper and lower cutting cables are positioned to an area at or near the ends of the spars where the spars attach to the interior of the wind turbine blade where the cut will be made by the cable to remove the spar. In a particular illustrative embodiment the invention, the upper and lower cutting cables are positioned to a point near the ends of the spars where the spars attach to the interior of the wind turbine blade where the cut will be made by the cable to remove the spar.

In a particular illustrative embodiment of the invention a system and method are presented to provide a complete scarf and breakdown of the turbine blade for upcycle and recycle by transport, trimming of unusable material on the bilateral portion of the robust spar material, cutting and preparation of boards into lengths and widths to utilize non-spar sections with fiberglass outer, removal of core of these sections by wide-toothed blade or water-jet to aid in transport of material or to preserve for repurpose the fiberglass paneling on its exterior, manipulation of and positioning of materials throughout the process. The spar cleaning aspect of the device as the device will also have capabilities to process non-spar material into varying specific lengths and widths. These spars and boards can further be processed on the machine by being perforated, sealed, and painted to ready them for immediate utilization in construction applications. These prepared boards will have applications that will include but not be limited to crane mats, hardy boards, security walls, ballistic and bulletproofing applications, etc.

Figure 17:
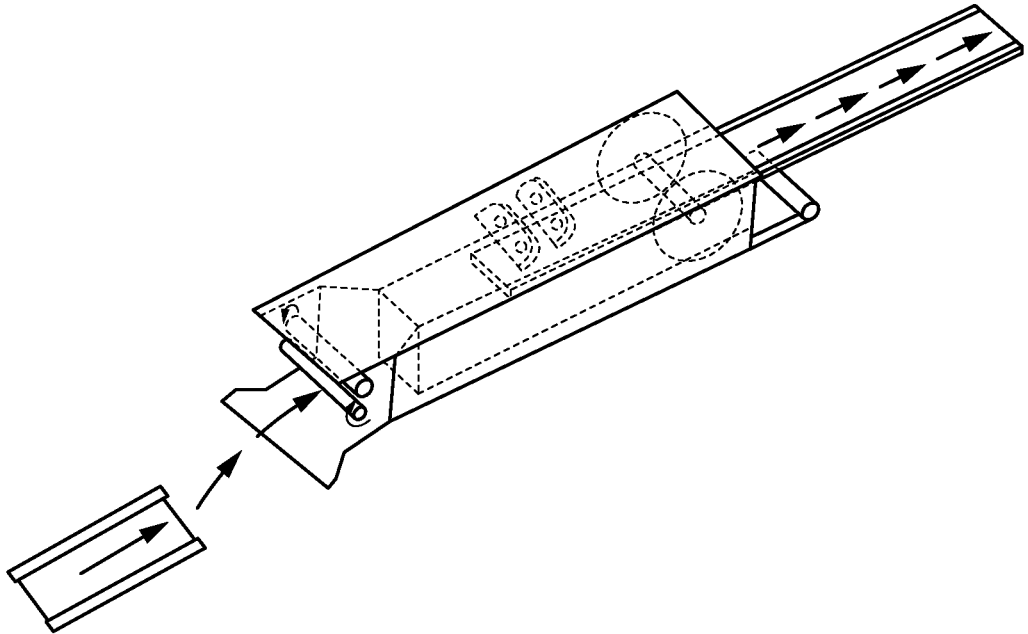
FIG. 17 is a schematic depiction of an illustrative embodiment of the invention showing a guidance system comprised of physical guides, rollers, lasers, and or conveyers will align the spar to prepare its orientation for entry into the trash removal cutting machine.

Spars are cut from wind turbine blades as shown in applicant's co-pending patent applications. The present invention trims the spars to preserve a usable center section of the spar and remove the unusable sections at the edges of the spar running along the longitudinal axis of the spar. Turning now to FIG. 17, FIG. 17 is a schematic depiction of an illustrative embodiment of the invention showing a guidance system comprised of physical guides, rollers, lasers, and or conveyers will align the spar to prepare its orientation for entry into the trash removal cutting machine. As shown in FIG. 17, an unclean spar is converted to a clean spar. An uncleaned spar is a raw spar cut from a wind turbine blade with a usable (good) center section and outer edges that are not wanted (referred to as trash). The present invention simultaneously cuts the unwanted edges from the spar yielding a usable spar center section and two edges that are considered expendable or trash. An excavator is shown on which a wind turbine blade is fed into the system wherein the excavator belt transports the spar into a pair of coaxial parallel saw blades that are positioned just inside the unwanted trash edges to cut the edges from the spar, leaving only the usable center section of the spar. In FIG. 17, the spar has a good center section that is thirty-six inches wide so that the spacing between the coaxially parallel saw blades is 36 inches aligned with the outer edge of the usable section so that the unwanted edges are cut from the spar as it moves on the conveyer belt through the coaxially parallel saw blades. In FIG. 17 an excavator arm attached to an excavator to scoop the spar into a hydraulic feed rollers that support the spar and advances the spar on through the pair of coaxial parallel saw blades that are positioned just inside the unwanted trash edges to cut the edges from the spar, leaving only the usable center section of the spar. The excavator provides hydraulic power to power the hydraulic feed rollers.

Figure 18:
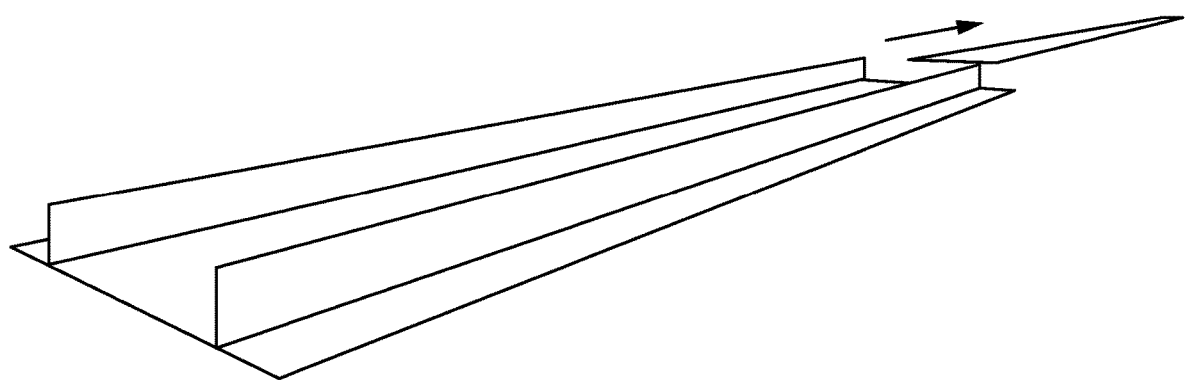
FIG. 18 is a schematic depiction of an illustrative embodiment of the invention showing a guidance system comprised of physical guides, rollers, lasers, and or conveyers will align the spar to prepare its orientation for entry into the trash removal cutting machine; and Excavator place a spar into guidance system prior to its movement into the cutting process.

FIG. 18 is a schematic depiction of an illustrative embodiment of the invention showing a guidance system comprised of physical guides, rollers, lasers, and or conveyers will align the spar to prepare its orientation for entry into the trash removal cutting machine; and Excavator will place spar into guidance system prior to its movement into the cutting process.

Figure 19:
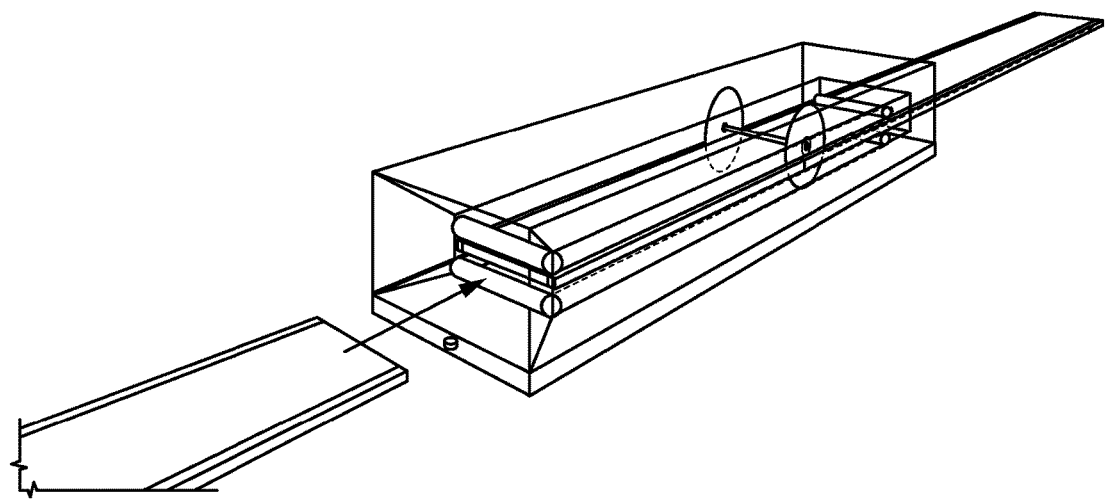
FIG. 19 is a schematic depiction of an illustrative embodiment of the invention showing a wind turbine spars of various lengths and widths will be cleaned and reduced to lengths and widths of specific proportions by machine.

FIG. 19 is a schematic depiction of an illustrative embodiment of the invention showing a wind turbine spars of various lengths and widths will be cleaned and reduced to lengths and widths of specific proportions by machine. The raw spar material is feed into the machine using a side swing motion of the excavator. A plurality of rollers powered by the hydraulic functions of the excavator's Aux 2 and a low-flow motor feed the spar in and out of the machine and through the cutting process. A plurality of saw blades powered by a hydraulic hi-flow motor on Aux 1 of the excavator. A trough will catch debris and water from saw and recycle through pumps and filtration. A belt or plurality of belts will turn rollers via sprockets powered by hydraulic function of Aux 2 on excavator.

Figure 20:
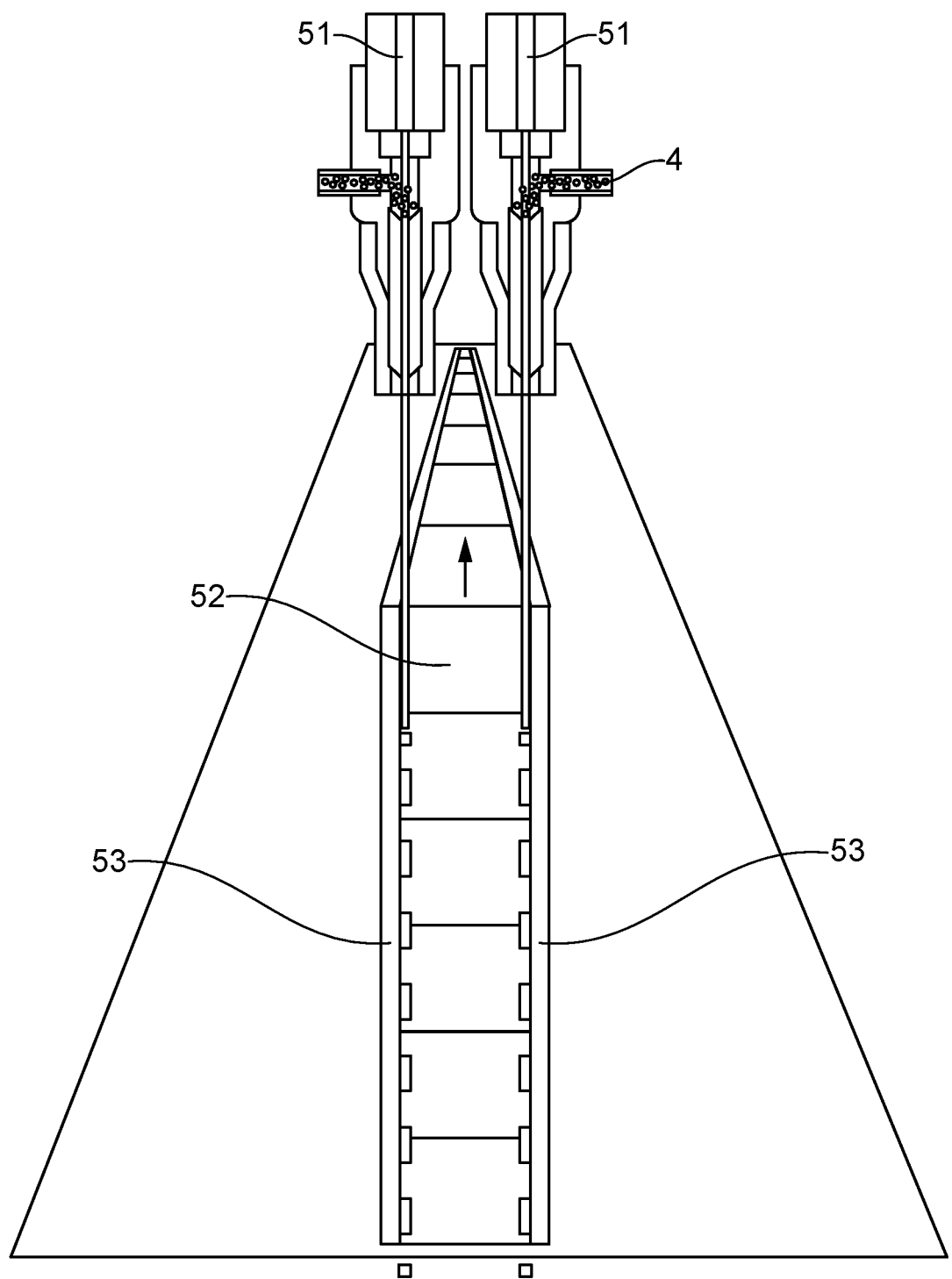
FIG. 20 is schematic representation of a system and method for utilizing water jets to remove balsa wood inner material from the non-spar regions of a wind turbine blade using water jets to remove softer material such as balsa wood from the non-spar regions of a wind turbine blade.

FIG. 20 is schematic representation of a system and method for utilizing water jets to remove balsa wood inner material from the non-spar regions of a wind turbine blade using water jets to remove softer material such as balsa wood from the non-spar regions of a wind turbine blade.

An illustrative embodiment of the invention is disclosed herein, for removing non-spar regions of a wind turbine blade. In a particular illustrative embodiment of the invention, a system and method of utilizing water jets to remove the balsa wood inner material from the non-spar regions of a wind turbine blade are disclosed. As shown in FIG. 20, a water jet, or a plurality of water jets transverses a longitudinal plane perpendicular to the work surface and cut the material at an adjustable width and depth to adequately remove the balsa wood while being non-destructive to the composite sheathing material shown in green. The water jets are positioned at the edges of the interface between the balsa wood and the harder material from which the wind turbine blade is constructed. Water jets are shown with an abrasive feed, but non-abrasive water jets are encompassed in the scope of this device. The abrasive feed mixes in with the water sprayed by the water jet and increases the cutting action of the water jet on the balsa wood or other material from the composite sheathing.

As shown in FIG. 20, dual water jets 51 with abrasives feed 54. Non-abrasive water jets are also covered in the scope of this device. A single water jet or a plurality are also covered within the scope of this device. Balsa wood composite 52 to be removed by water jet removal system in a particular illustrative embodiment of the invention. The harder material 53, which in the present example of the invention is the fiberglass or other composite to be cleaned form the wind turbine blade composite sheathing for recycling and repurposing wind turbine blade composite sheathing.

The invention claimed is:

1. A system for recycling wind turbine blades into a crane mat, the system comprising:
   a trimmer that removes outer covering from a wind turbine blade;
   a cutter that cuts the wind turbine blade into a plurality of uniform boards;
   a plurality of rings the connect a plurality of the plurality of uniform boards side by side into two rows of the plurality of uniform boards, wherein the two rows each have a first end and a second end, and wherein the plurality of rings connects a first end of the first row to a second end of the second row together to form a crane mat;
   a loader that bifolds the crane mat onto itself in half along a latitudinal axis of the crane mat;
   a trailer for loading the bifolded crane mat;
   a line attached to the bifolded crane mat to pull the bifolded crane mat onto the trailer; and
   a winch that pulls the bifolded crane mat onto the trailer; and
   an electromagnet is used to guide a roller and an attached pilot cable through the length of the interior of the wind turbine blade, wherein the roller is urged along a path by moving the electromagnet on the outside surface of the wind turbine blade, along said path, while the electromagnet is electromagnetically engaged with the roller so that movement of the electromagnet causes corresponding movement of the roller that tracks the path of the electromagnet, wherein the pilot cable is then used to pull heavy upper and lower cutting cables through the length of the interior of the wind turbine blade along said path.

2. The system of claim 1, wherein the trimmer is a water jet trimmer.

3. The system of claim 1, wherein the cutter is a saw.

4. The system of claim 1 wherein the ring is a welded ring.

5. The system of claim 1 wherein the ring is a wire rope.

6. A system for recycling wind turbine blades into a crane mat, the system comprising:
- a trimmer that removes outer covering from a wind turbine blade;
- a cutter that cuts the wind turbine blade into a plurality of uniform boards;
- a plurality of rings the connect a plurality of the plurality of uniform boards side by side into two rows of the plurality of uniform boards, wherein the two rows each have a first end and a second end, and wherein the plurality of rings connects a first end of the first row to a second end of the second row together to form a crane mat;
- a loader that bifolds the crane mat onto itself in half along a latitudinal axis of the crane mat;
- a trailer for loading the bifolded crane mat;
- a line attached to the bifolded crane mat to pull the bifolded crane mat onto the trailer; and
- a winch that pulls the bifolded crane mat onto the trailer.

7. A method for recycling a wind turbine blade into a crane mat, the method comprising:
- removing outer covering from a wind turbine blade with a trimmer;
- cutting the wind turbine blade into a plurality of uniform boards using a cutter;
- connecting the plurality of the plurality of uniform boards side by side into two rows of the plurality of uniform boards, using a plurality of rings, wherein the two rows each have a first end and a second end, and wherein the plurality of rings connects a first end of the first row to a second end of the second row together to form a crane mat;
- bifolding the crane mat onto itself in half along a latitudinal axis of the crane mat using a loader;
- loading the bifolded crane mat onto a trailer using a line attached to the bifolded crane mat to pull the bifolded crane mat onto the trailer; and
- pulling the bifolded crane mat onto the trailer using a winch.

8. The method of claim 7, wherein the trimmer is a water jet trimmer.

9. The method of claim 7, wherein the cutter is a saw.

10. The method of claim 7 wherein the ring is a welded ring.

11. The method of claim 7 wherein the ring is a wire rope.

12. The method of claim 7, further comprising:
- guiding a roller using an electromagnetic attached to a pilot cable through the length of the interior of the wind turbine blade, wherein the roller is urged along a path by moving the electromagnet on the outside surface of the wind turbine blade, along said path, while the electromagnet is electromagnetically engaged with the roller so that movement of the electromagnet causes corresponding movement of the roller that tracks the path of the electromagnet, wherein the pilot cable is then used to pull heavy upper and lower cutting cables through the length of the interior of the wind turbine blade along said path.

* * * * *